(12) United States Patent
Damavandi et al.

(10) Patent No.: US 9,144,042 B2
(45) Date of Patent: Sep. 22, 2015

(54) METHOD FOR FAST AUTOMATIC POWER CONTROL OF WIRELESS TRANSMITTERS

(71) Applicant: Marvell World Trade Ltd., St. Michael (BB)

(72) Inventors: Nader Damavandi, Irvine, CA (US); Rony Ashkenazi, Moshav Kidron (IL); Alexander Zaslavsky, Petach Tikva (IL); John Vasa, Irvine, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 52 days.

(21) Appl. No.: 14/084,560

(22) Filed: Nov. 19, 2013

(65) Prior Publication Data
US 2014/0141730 A1    May 22, 2014

Related U.S. Application Data

(60) Provisional application No. 61/729,052, filed on Nov. 21, 2012.

(51) Int. Cl.
*H04B 1/04* (2006.01)
*H04W 52/52* (2009.01)

(52) U.S. Cl.
CPC ..................... *H04W 52/52* (2013.01)

(58) Field of Classification Search
CPC .... H04W 52/146; H04W 52/52; H04W 52/08
USPC ........ 455/127.1, 127.2, 522, 136, 138, 232.1, 455/240.1; 375/345, 297
See application file for complete search history.

(56) References Cited

U.S. PATENT DOCUMENTS

| | | | |
|---|---|---|---|
| 6,253,085 B1 * | 6/2001 | Bender | 455/442 |
| 6,512,750 B1 | 1/2003 | Palenius | |
| 6,757,319 B1 | 6/2004 | Parsa et al. | |
| 6,795,694 B2 | 9/2004 | Uesugi | |
| 7,062,236 B2 | 6/2006 | Midtgaard et al. | |
| 7,263,135 B2 | 8/2007 | Takabayashi et al. | |
| 7,483,404 B2 * | 1/2009 | Zhang | 370/318 |
| 7,680,174 B2 * | 3/2010 | Tiedemann et al. | 375/141 |
| 7,773,691 B2 * | 8/2010 | Khlat et al. | 375/296 |
| 7,809,044 B2 * | 10/2010 | Tiedemann et al. | 375/141 |
| 8,099,139 B1 | 1/2012 | Zaslavsky et al. | |

(Continued)

FOREIGN PATENT DOCUMENTS

JP    2010-258977 A    11/2010

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36-213 V8.4.0 (Sep. 2008), Sophia Antipolis, France.

(Continued)

*Primary Examiner* — Sonny Trinh

(57) ABSTRACT

A circuit includes a transmit path to receive an input signal and generate an output signal to be output at a transmit power level according to a power target signal. The circuit also includes a gain corrector to output a signal for adjusting a power level of the output signal to correspond to the transmit power level. The signal for adjusting is based on the power target signal and a delay for time-aligning a first signal and a second signal.

18 Claims, 9 Drawing Sheets

(56) References Cited

U.S. PATENT DOCUMENTS

| | | | |
|---|---|---|---|
| 8,150,478 | B2 | 4/2012 | Perets et al. |
| 8,874,051 | B2 * | 10/2014 | Rozenblit et al. .......... 455/127.1 |
| 2002/0187802 | A1 | 12/2002 | Agin et al. |
| 2006/0068725 | A1 | 3/2006 | Zolfaghari |
| 2007/0149229 | A1 | 6/2007 | Frederiksen et al. |
| 2007/0287393 | A1 | 12/2007 | Nandipaku et al. |
| 2008/0014980 | A1 | 1/2008 | Yano et al. |
| 2010/0016009 | A1 | 1/2010 | Andersson et al. |

OTHER PUBLICATIONS

Nortel, "On the discussions of carrier aggregations", 3GPP TSG-RAN Working Group 1 Meeting #55, Prague, Czech Republic, Nov. 10-14, 2008.

NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.

3$^{rd}$ Generation Partnership Project; Technical Specification Group Radio Access Network; User Equipment (UE) radio transmission and reception (FDD) (Release 8), 3GPP TS 25.101 V8.5.1 (Jan. 2009), Sophia Antipolis, France.

Ericsson, "Carrier Aggregation in LTE-Advanced", TSG-RAN WG1 #53bis, Warsaw, Poland, Jun. 30-Jul. 4, 2008.

Alcatel-Lucent, "Fractional Power Control using Pilot Power Ratio Measurements for the E-UTRA Uplink", 3GPP TSG-RAN WG1 #48, St. Louis, USA, Feb. 12-16, 2007.

Motorola, "Uplink Power Control for E-UTRA", 3GPP TSG RAN1 #48, St. Louis, USA, Feb. 12-16, 2007.

Motorola, "Interference Mitigation via Power Control and FDM Resource Allocation and UE Alignment for E-UTRA Uplink and TP", 3GPP TSG RAN1 #44, Denver, USA, Feb. 13-17, 2006.

Rapporteur (NTT DoCoMo), "Text proprosal for RAN1 TR on LTE-Advanced", 3GPP TSG RAN WG1 Meeting #53bis, Warsaw, Poland, Jun. 30-Jul. 4, 2008.

International Search Report for PCT/IB09/52987 filed on Jul. 9, 2009.

Research in Motion, UK Limited, "Uplink Power Control for Carrier Aggregation", 3GPP TSG RAN WG1 Meeting #57b, Los Angeles, USA, Jun. 29-Jul. 3, 2009.

Nokia Siemens Networks, "PUSCH Power Control for LTE-Advanced", 3GPP TSG RAN WG1 Meeting #57bis, Los Angeles, USA, Jun. 29-Jul. 3, 2009.

3$^{rd}$ Generation Partnership Project; Technical Specification Group Radio Access Network; Radio Frequency (RF) System Scenarios (Release 5), 3GPP TR 25.942 V5.3.0 (Jun. 2004), Sophia Antipolis, France.

Nokia Siemens Networks, "Autonomous Component Carrier Selection for LTE Advanced", 3GPP TSG RAN WG1 Meeting #54, Jeju Island, Korea, Aug. 18-22, 2008.

Nokia Siemens Networks, "Algorithms and Results for Autonomous Component Carrier Selection for LTE Advanced", 3GPP TSG RAN WG1 Meeting #55, Prague, Czech Republic, Nov. 10-14, 2008.

Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.

Qualcomm Europe, "Notion of Anchor Carrier in LTE-A", 3GPP TSG RAN WG1 Meeting #55-bis, Ljubljana, Slovenia, Jan. 12-16, 2009.

Samsung, "UL Transmission Power Control in LTE-A", 3GPP TSG RAN WG1 Meeting #56bis, Seoul, Korea, Mar. 23-27, 2009.

NTT DOCOMO et al., "Prioritized Deployment Scenarios for LTE-Advanced Studies", 3GPP TSG RAN WG4 Meeting #50, Athens, Greece, Feb. 9-13, 2009.

Nokia Siemens Networks, "LTE-Advanced SU-MIMO UE Transmission in LTE Release 8 Network", 3GPP TSG RAN WG1 Meeting #57, San Francisco, USA, May 4-8, 2009.

3$^{rd}$ Generation Partnership Project; Technical Specification Group Radio Access Network; Further Advancements for E-UTRA Physical Layer Aspects (Release 9), 3GPP TR 36.814 V0.4.1 (Feb. 2009), Sophia Antipolis, France.

3$^{rd}$ Generation Partnership Project; Technical Specification Group Radio Access Network; Evolved Universal Terrestrial Radio Access (E-UTRA); Physical Later Procedures (Release 8), Draft 3GPP TS 36.213 V8.6.0, Sophia Antipolis, France, 2009.

Huawei, "The Impact of CA on Mobility in LTE-A", 3GPP TSG RAN WG1 Meeting #56, Athens, Greece, Feb. 9-13, 2009.

3$^{rd}$ Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1 (Mar. 2009), Sophia Antipolis, France, 2009.

U.S. Appl. No. 13/351,273, filed Jan. 17, 2012.

Office Action for U.S. Appl. No. 12/397,366 dated Jul. 19, 2011.

International Search Report and Written Opinion for PCT/US2013/070846, filed Nov. 19, 2013.

* cited by examiner

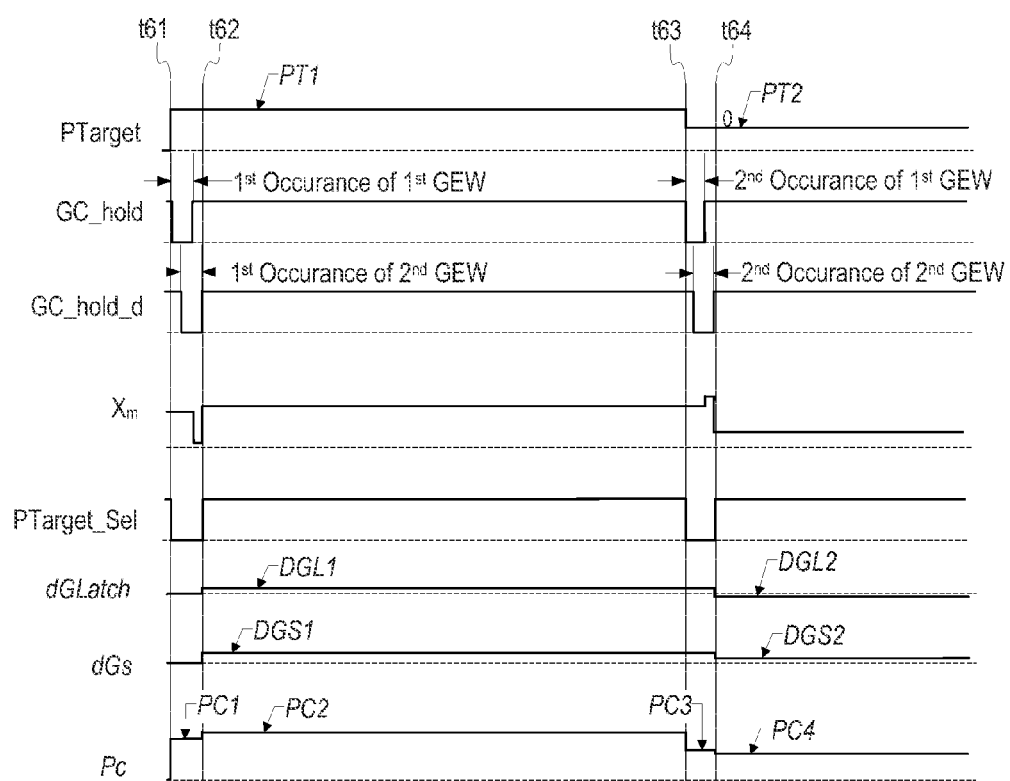

METHOD FOR FAST AUTOMATIC POWER CONTROL OF WIRELESS TRANSMITTERS

CROSS-REFERENCE TO RELATED APPLICATIONS

This present disclosure claims the benefit of U.S. Provisional Application No. 61/729,052, "METHOD FOR FAST AUTOMATIC POWER CONTROL OF WIRELESS TRANSMITTERS," filed on Nov. 21, 2012, which is incorporated by reference herein in its entirety.

The present disclosure is related to U.S. application Ser. No. 13/351,273, filed on Jan. 17, 2012, U.S. application Ser. No. 13/330,715, filed on Dec. 20, 2011, U.S. application Ser. No. 12/397,366, filed on Mar. 4, 2009, U.S. application Ser. No. 61/566,877, filed on Dec. 5, 2011, and U.S. application Ser. No. 61/034,285, filed on Mar. 6, 2008, which are each incorporated by reference herein in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless telecommunication systems require accurate control of transmit power under a wide range of operating conditions. This includes "3G" systems that comply with the International Mobile Telecommunications-2000 (IMT-2000) specifications and "4G" systems such as Long Term Evolution (LTE) and Mobile WiMax. Accurate and robust transmit power control is required both in user equipment (UE) such as cellular phone, tablets, computers and mobile hotspots and in service provider equipment such as base stations, eNodeBs, and Wireless Access Points (WAP).

Transmit power control can generally be characterized as either open loop power control (OLPC) or closed loop power control (CLPC). OLPC adjusts the output power based on predetermined calibration data. However, under OLPC, it is difficult to compensate for variations in the characteristics of the transmitter due to part-to-part variations in the components of the transmitter. Similarly, it is also difficult to compensate for changes in the characteristics of the transmitter over time as parts age or under all operating conditions.

CLPC differs from OLPC by using power measurement feedback, which allows CLPC to be potentially more accurate than OLPC.

BRIEF SUMMARY

In an embodiment, a circuit comprises a transmit path to receive an input signal and generate an output signal at a transmit power level according to a power target signal, and a gain corrector to output a signal for adjusting a power level of the output signal to correspond to the transmit power level. The signal for adjusting is based on the power target signal and a delay for time-aligning a first signal and a second signal.

In an embodiment, the circuit includes a receive path to receive the output signal of the transmit path and generate a received signal, and a gain estimator to output a measured gain signal associated with the transmit path using a first average signal of the input signal during a first estimation window and a second average signal of the received signal during a second estimation window.

In an embodiment, the gain corrector determines the signal for adjusting using the power target signal and the measured gain signal.

In an embodiment, the first signal is the input signal and the second signal is the received signal, and a beginning of the second gain estimation window occurs the delay after a beginning of the first gain estimation window.

In an embodiment, the delay includes a propagation delay through the transmit path and a propagation delay through the receive path.

In an embodiment, the circuit is incorporated into an integrated circuit or a semiconductor chip.

In an embodiment, a method generates an output signal at a transmit power level according to a power target signal. The output signal is based on an input signal received. The method also outputs a signal for adjusting a power level of the output signal to correspond to the transmit power level. The signal for adjusting is based on the power target signal and a delay for time-aligning a first signal and a second signal.

In an embodiment, the method generates an received signal based on the output signal received from the transmit path, and outputs measured gain signal associated with the transmit path using a first average signal of the input signal during a first estimation window and a second average signal of the received signal during a second estimation window.

In an embodiment, the signal for adjusting is determined using the power target signal and the measured gain signal.

In an embodiment, the first signal is the input signal and the second signal is the received signal, and a beginning of the second gain estimation window occurs the delay after a beginning of the first gain estimation window.

In an embodiment, the delay includes a propagation delay through the transmit path and a propagation delay through the receive path.

In an embodiment, the first average signal includes an average magnitude of the input signal during the first estimation window and the second average signal includes an average magnitude of the received signal during the second estimation window.

In an embodiment, the first average signal includes an average power of the input signal during the first estimation window and the second average signal includes an average power of the received signal during the second estimation window.

BRIEF DESCRIPTION OF THE DRAWINGS

FIG. 6 depicts waveforms showing operation of the gain corrector of FIG. 5.

DETAILED DESCRIPTION

Figure 1:
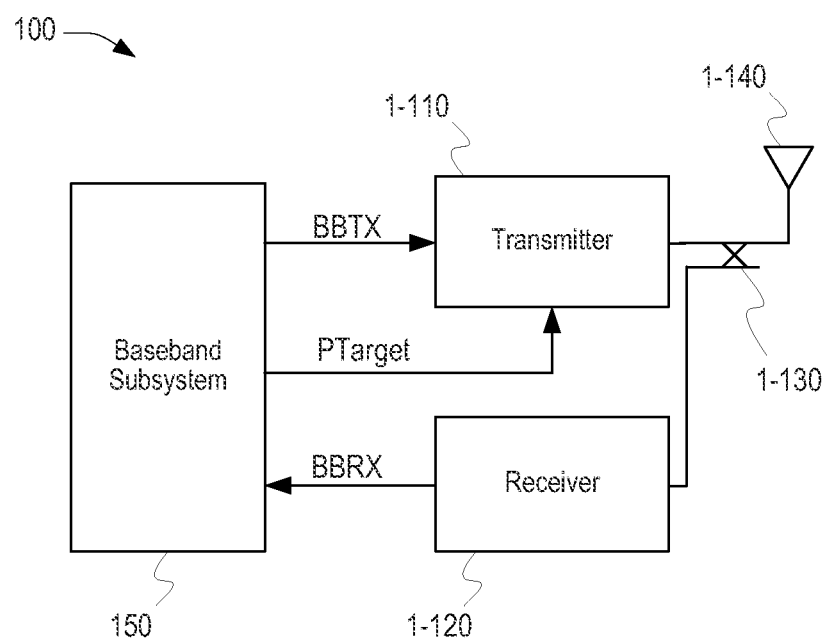
FIG. 1 is a block diagram of portions of a wireless device.

FIG. 1 is a block diagram of portions of a wireless device 100 including a transmitter 1-110. The transmitter 1-110 receives a baseband transmit signal BBTX from a baseband subsystem 150 and modulates a Radio Frequency (RF) carrier using the baseband transmit signal BBTX. In an embodiment, the baseband transmit signal BBXT comprises I and Q signals.

The transmitter 1-110 transmits the modulated carrier using an antenna 1-140 at a transmit power level according to a power target signal PTarget received from the baseband subsystem 150. The transmitter 1-110 is coupled to the antenna 1-140 through a directional coupler 1-130. A receiver 1-120 is also coupled to the antenna 1-140 through the directional coupler 1-130.

The receiver 1-120 receives RF signals from the antenna 1-140 and converts them to baseband receive signals BBRX. The baseband subsystem 150 receives the baseband receive signals BBRX from the receiver 1-120. In an embodiment, the baseband receive signal comprises I and Q signals which together define the amplitude and phase of the baseband receive signals BBRX.

Figure 2:
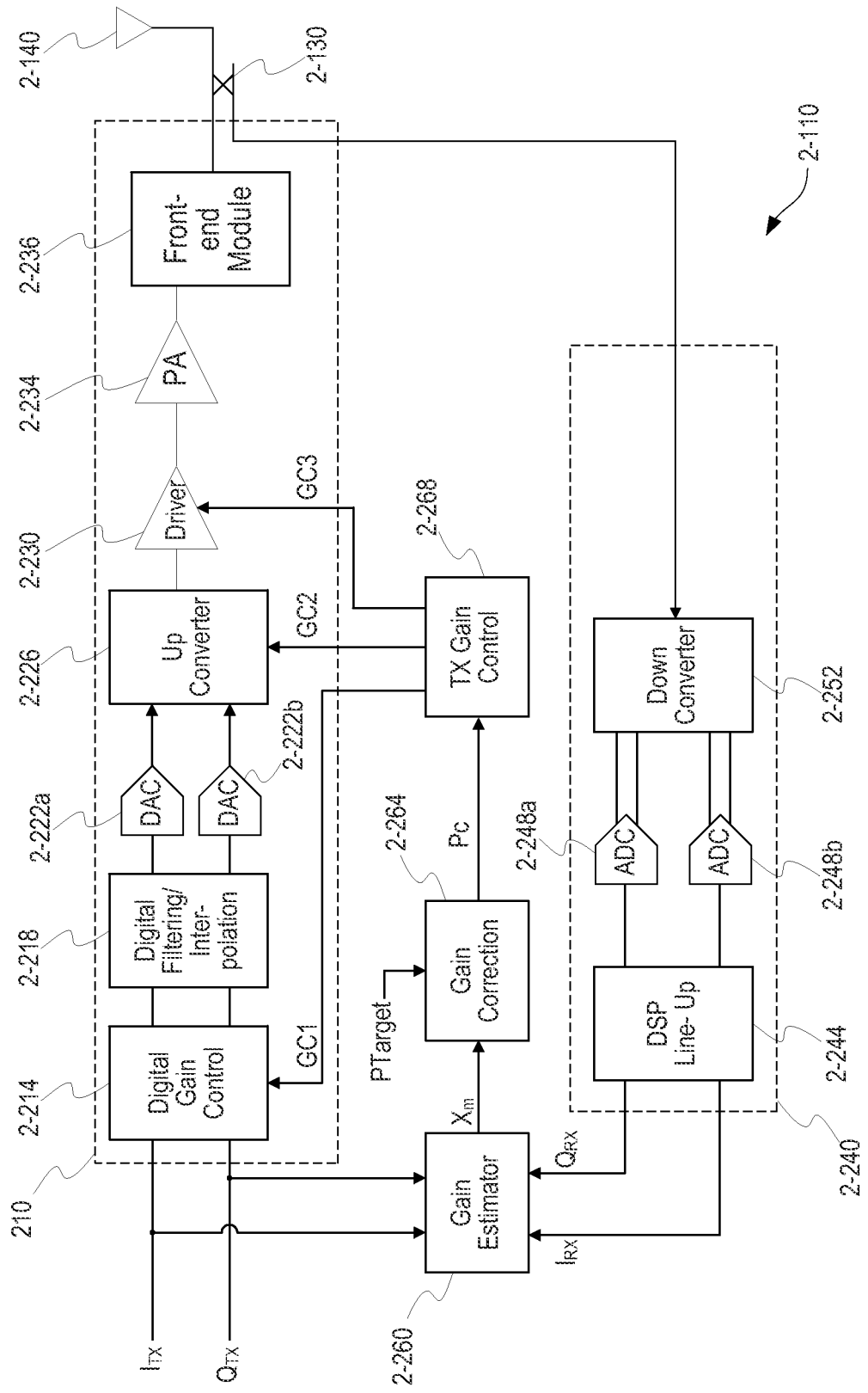
FIG. 2 is a circuit diagram of a transmitter in accordance with an embodiment of the disclosure.

FIG. 2 is a circuit diagram of a transmitter 2-110 in accordance with an embodiment. The transmitter 2-110 is used in the wireless device 100 and includes a transmitter (TX) path 210 and a receiver (RX) path 2-240. TX path 210 defines a path between inputs $I_{TX}$ and $Q_{TX}$ and an antenna 2-140. RX path 2-240 defines a path between a directional coupler 2-130 and a gain estimator 2-260.

A person of skill in the art in light of the disclosure and teachings herein would understand that some subcomponents of transmitter 2-110 could be implemented using digital electronic circuits such as adders, multipliers, state machines, and logic gates, and/or using instructions stored on a non-transitory computer-readable media and executed on a digital signal processor (DSP), microcontroller, special-purpose computer, or general-purpose computer.

A plurality of $I_{TX}$ and $Q_{TX}$ data pairs ($I_{TX}/Q_{TX}$ data) to be transmitted enter the transmitter 2-110. The $I_{TX}/Q_{TX}$ data is a baseband signal that conveys amplitude and phase information for modulating a carrier or subcarrier of the transmitted signal. The $I_{TX}/Q_{TX}$ data may be digitally encoded, such as by being expressed as 12, 16, or 32 bit integers or as floating point values. Furthermore, the $I_{TX}/Q_{TX}$ data may enter transmitter 2-110 in a bit-serial or bit-parallel fashion.

A digital gain controller 2-214 receives the $I_{TX}/Q_{TX}$ data and multiplies the data by a first gain control signal GC1 received from a TX gain controller 2-268. In an embodiment, the first gain control signal GC1 is a scaling value or a scaling exponent and may be digitally encoded.

A digital filter/interpolator 2-218 receives the scaled $I_{TX}/Q_{TX}$ data and performs filtering and interpolation of the $I_{TX}/Q_{TX}$ data. The digital filter/interpolator 2-218 may include a Finite Impulse Response (FIR) filter including fixed or programmable coefficients. The FIR filter may also perform interpolation in order to increase the number of $I_{TX}/Q_{TX}$ data pairs. A Cascaded Integrate-Comb (CIC) Filter may also be used to interpolate the $I_{TX}/Q_{TX}$ data.

Digital-to-Analog Converters (DACs) 2-222a and 2-222b receive the filtered and interpolated $I_{TX}/Q_{TX}$ data and convert it to analog I and Q output signals.

An up converter 2-226 receives the analog I and Q output signals and uses them to modulate a carrier signal. In an embodiment, the up converter 2-226 multiplies the analog I signal by the carrier signal, multiplies the analog Q signal by a 90 degree phase-shifted version of the carrier signal, and sums the results of the multiplications to produce a Radio Frequency (RF) output signal. The up converter 2-226 also adjusts the amplitude of the RF output signal according to a second gain control signal GC2 received from the TX gain controller 2-268.

A driver 2-230 and a Power Amplifier (PA) 2-234 amplify the RF output signal to produce the transmit signal. The gain of a driver 2-230 varies according to a third gain control signal GC3 received from the TX gain controller 2-268. The PA 2-234 is coupled to an antenna 2-140 through a Front-End Module 2-236. In an embodiment, antenna 2-140 is a multi-element antenna.

A directional coupler 2-130 is connected between the Front-end Module 2-236 and the antenna 2-140 to provide a feedback signal according to the transmit signal. The directional coupler 2-130 directs a defined amount of the power of the transmit signal to the RX path 2-240 as a feedback signal. For example, the directional coupler 2-130 may have a coupling factor of 20 dB indicating that 1/100th of the power of the transmit signal is directed to the RX path 2-240 as the feedback signal.

In an embodiment, the RX path 2-240 is an auxiliary receiver that is not used to process signals received through the antenna 2-140. Alternatively, in an embodiment using Time-Division Duplexing (TDD), Time Division Multiple Access (TDMA), or a half-duplex communication scheme, the RX path 2-240 may be a primary receiver of the wireless device.

In RX-Path 2-240, the feedback signal from directional coupler 2-130 is received by a down converter 2-252. The down converter 2-252 converts the feedback signal from an RF signal to a baseband signal and produces analog I and Q received signals. The analog I and Q received signals taken together convey amplitude and phase information about the down-converted feedback signal.

Analog-to-Digital Converters (ADCs) 2-248a and 2-248b convert the analog I and Q received signals to digital I and Q received signals.

A DSP line-up 2-244 receives the digital I and Q received signals to produce $I_{RX}$ and $Q_{RX}$ data pairs ($I_{RX}/Q_{RX}$ data).

A gain estimator 2-260 receives the $I_{TX}/Q_{TX}$ data pairs and the $I_{RX}/Q_{RX}$ data pairs and periodically computes the TX path gain signal $X_m$ (or measured gain signal) of the TX path 210. The gain estimation block 2-260 calculates the TX path gain signal $X_m$ using the $I_{TX}/Q_{TX}$ data pairs, the $I_{RX}/Q_{RX}$ data pairs, a delay for time-aligning the $I_{TX}/Q_{TX}$ and $I_{RX}/Q_{RX}$ data pairs, and calibration data for the RX path 2-240. The period during which the TX path gain signal $X_m$ is computed is a gain estimation window.

A gain corrector 2-264 receives the TX path gain signal $X_m$ and a power target PTarget and determines a measured gain error using the TX path gain signal $X_m$ and the power target PTarget. The gain corrector 2-264 determines a corrected power target signal Pc (or a signal for adjusting a power level of the output signal) using the measured gain error and the power target PTarget.

The TX gain controller 2-268 receives the corrected power target signal Pc and determines the first, second and third gain control signals GC1, GC2, and GC3 according to the corrected power target signal Pc. As a result, a desired level of power output is transmitted through the antenna 2-140. GC1 through GC3 are generated using a look up table (LUT) that partitions a given gain code to 3 gain adjustment blocks namely digital gain control 2-214, and analog gain controls inside up converter 2-226 and driver amplifier 2-230.

Figure 3:
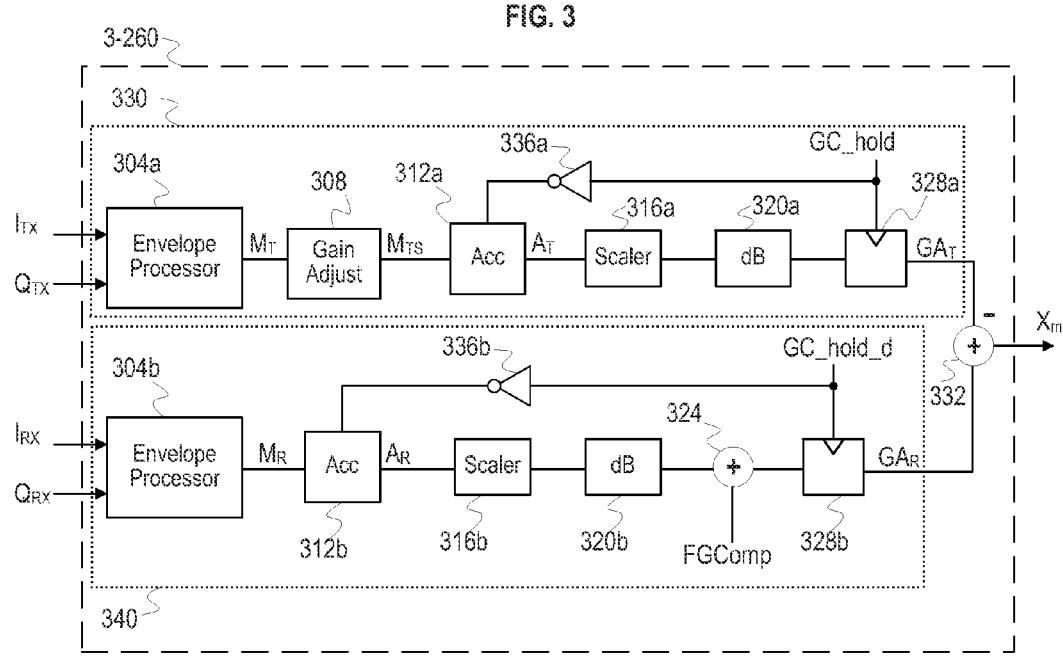
FIG. 3 is a circuit diagram of a gain estimator in accordance with an embodiment.

FIG. 3 is a circuit diagram of a gain estimator 3-260 in accordance with an embodiment of the disclosure. The gain estimator 3-260 is used in the transmitter 2-110 and includes first and second estimation circuits 330 and 340. The first estimation circuit 330 includes a first envelope processor 304a, a gain adjuster 308, a first accumulator 312a, a first scaler 316a, a first converter 320a, and a first latch 328a. The second estimation circuit 340 includes a second envelope processor 304b, a second accumulator 312b, a second scaler 316b, a second converter 320b, a first adder 324, and a second latch 328b.

The first envelope processor 304a receives the $I_{TX}$ and $Q_{TX}$ signals and outputs a TX baseband measurement signal $M_T$. The second envelope processor 304b receives the $I_{RX}$ and $Q_{RX}$ signals and outputs an RX baseband measurement signal $M_R$. In an embodiment, the TX and RX baseband measurement signals $M_T$ and $M_R$ are baseband magnitude measurements $BB_M$ according to Equation 1:

$$BB_M = \sqrt{I^2 + Q^2} \qquad 1$$

In another embodiment, the TX and RX baseband measurement signals $M_T$ and $M_R$ are baseband power measurements $BB_P$ according to Equation 2:

$$BB_P = I^2 + Q^2 \qquad 2$$

In an embodiment, $BB_M$ or $BB_P$ is calculated using a Coordinated Rotation Digital Computation (CORDIC) algorithm.

The gain adjuster 308 receives the TX baseband measurement signal $M_T$ and scales it by a gain adjustment $g_{BB}$ to produce a scaled TX baseband measurement signal $M_{TS}$. Gain adjuster 308 is used to adjust the relative gain of the first estimation circuit 330 relative to the second estimation circuit 340 by a positive value or a negative value.

Figure 4:
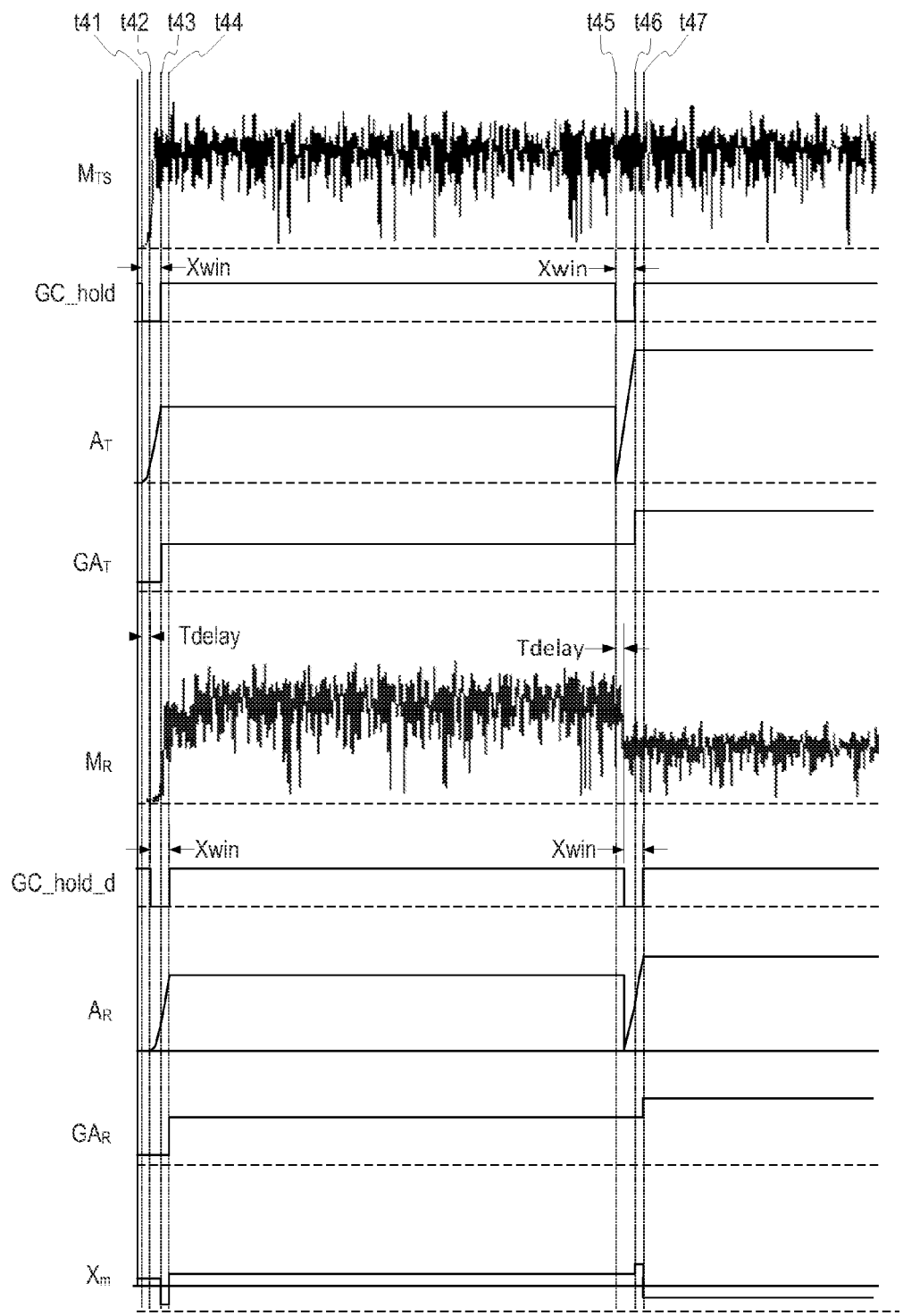
FIG. 4 depicts waveforms showing operation of the gain estimation block of FIG. 3.

The first accumulator 312a receives the scaled TX baseband measurement signal $M_{TS}$ and sums N values of the scaled TX baseband measurement signal $M_{TS}$ during a first gain estimation window having a sampling window duration Xwin (see FIG. 4, where N is the number of $I_{TX}/Q_{TX}$ data pairs received by the first envelope processor 304a during the first gain estimation window. The output of the first accumulator 312a is an aligned TX measurement signal $A_T$. The first gain estimation window is determined using an inverted version of Gain Control (GC) hold signal GC_hold produced using an inverter 336a, as will be described later with reference to FIG. 7.

Similarly, the second accumulator 312b receives the RX baseband measurement signal $M_R$ and sums N values of the RX baseband measurement signal $M_R$ during a second gain estimation window having a sampling window duration Xwin, where N is the number of $I_{RX}/Q_{RX}$ data pairs received by the second envelope processor 304b during the second gain estimation window. The output of second accumulator 312b is an aligned RX measurement signal $A_R$. The second gain estimation window is determined using an inverted version of a delayed GC hold signal GC_hold_d produced using inverter 336a, as will be described later with reference to FIG. 7.

The delayed GC hold signal GC_hold_d corresponds to a delayed version of the GC hold signal GC_hold. A GC delay time $T_{delay}$ used to generate the delayed GC hold signal GC_hold_d from the GC hold signal GC_hold is selected so as to time-align the $I_{TX}/Q_{TX}$ data pairs and the $I_{RX}/Q_{RX}$ data pairs. As a result, the time-aligned $I_{RX}/Q_{RX}$ data pairs in the second gain estimation window correspond to the respective $I_{TX}/Q_{TX}$ data pairs in the first gain estimation window. In an embodiment, the GC delay time $T_{delay}$ includes a time for a signal to propagate through the TX path 210, the directional coupler 2-130, and the RX path 2-240.

The aligned TX and RX measurement signals $A_T$ and $A_R$ are scaled by a factor of $2^{-M}$ by first and second scalers 316a and 316b, respectively, where M=int($\log_2$ N). The scaled aligned measurement signals are then converted to decibels (dB) in first and second dB converters 320a and 320b by calculating twenty times the $\log_{10}$ of the outputs of scalers 316a and 316b, respectively.

The first adder 324 adds a Feedback Gain (FG) compensation signal FGComp to the output of dB converter 320b. The FG compensation signal FGComp is determined according to a variation over frequency, temperature, and/or voltage of a gain of the RX Path 2-240 and/or of the directional coupler 2-130.

The first latch 328a latches the output of dB converter 320a according to the GC hold signal GC_hold to produce gated average TX signal $GA_T$. The second latch 328b latches the output of first adder 324 according to the delayed GC hold signal GC_hold_d to produce gated average RX signal $GA_R$.

The second adder 332 (or gain computing circuit) computes the difference between the output of first and second latches 328a and 328b to produce the TX path gain signal $X_m$. Accordingly, when envelope processors 304a and 304b are computing baseband magnitude measurements, the TX path gain signal $X_m$ is determined according to Equation 3:

$$X_m = 20\log_{10}\left(\frac{1}{2^M}\sum_{n=1}^{N}\sqrt{BB_{RX}(n)}\right) - 20\log_{10}\left(\frac{g_{BB}}{2^M}\sum_{n=1}^{N}\sqrt{BB_{TX}(n-d)}\right) + FGComp \qquad \text{Equation 3}$$

wherein $BB_{RX}(n) = I_{RX}(n)^2 + Q_{RX}(n)^2$, $BB_{TX}(n) = I_{TX}(n)^2 + Q_{TX}(n)^2$, d is the delay between the GC hold signal GC_hold and the delayed GC hold signal GC_hold_d in samples, and $I_{TX}(n)$, $Q_{TX}(n)$, $I_{RX}(n)$, and $Q_{RX}(n)$ represent the value at time n of signals $I_{TX}/Q_{TX}$, $I_{RX}$, and $Q_{RX}$, respectively.

When the envelope processors 304a and 304b are computing baseband power measurements, the TX path gain signal $X_m$ is determined according to Equation 4:

$$X_m = 20\log_{10}\left(\frac{1}{2^M}\sum_{n=1}^{N}BB_{RX}(n)\right) - 20\log_{10}\left(\frac{g_{BB}}{2^M}\sum_{n=1}^{N}BB_{TX}(n-d)\right) + FGComp \qquad \text{Equation 4}$$

FIG. 4 depicts waveforms showing operation of the gain estimator 3-260 of FIG. 3 according to an embodiment. Although some of the waveforms in FIG. 4 are shown as continuous values, that is, as analog values, a person of skill in the art in light of the disclosure and teachings herein would understand that the waveforms may represent the equivalent value of a multi-bit digitally-encoded signal.

At a first time t41, a first signal is transmitted on GC hold signal GC_hold which resets the value of aligned TX measurement signal $A_T$ to zero and begins the accumulation of scaled TX baseband measurement signal $M_{TS}$ into aligned TX measurement signal $A_T$.

At a second time t42 that is a GC time delay $T_{delay}$ after the first time t41, a second signal is transmitted on delayed GC hold signal GC_hold_d which resets the value of aligned RX measurement signal $A_R$ to zero and begins the accumulation of value of TX baseband measurement signal $M_T$ into aligned RX measurement signal $A_R$.

At a third time t43 that is a sampling window duration $X_{win}$ after the first time t41, a third signal is transmitted on GC hold signal GC_hold which stops the accumulation of TX baseband measurement signal $M_T$ into aligned TX measurement signal $A_T$. The aligned TX measurement signal $A_T$ is then scaled, converted to decibels, and latched to produce gated average TX signal $GA_T$.

At a fourth time t44 that is a sampling window duration $X_{win}$ after the second time t42, a fourth signal is transmitted on delayed GC hold signal GC_hold_d which stops the accumulation of RX baseband measurement signal $M_R$ into aligned RX measurement signal $A_R$. The aligned RX measurement signal $A_R$ is then scaled, converted to decibels, added to FG Compensation signal FGComp, and latched to produce gated average RX signal $GA_R$.

The TX path gain signal $X_m$ is calculated using the difference between the gated average RX signal $GA_R$ and the gated average TX signal $GA_T$.

The sequence repeats beginning at a fifth time t45, with the gated average TX signal $GA_T$ and the gated average RX signal $GA_R$ being held latched until a sixth time t46 and a seventh time t47, respectively. In an embodiment, the fifth time t45 corresponds to a time when the power target signal PTarget may be changed, for example, the beginning of a subframe of an LTE frame.

Figure 5A:
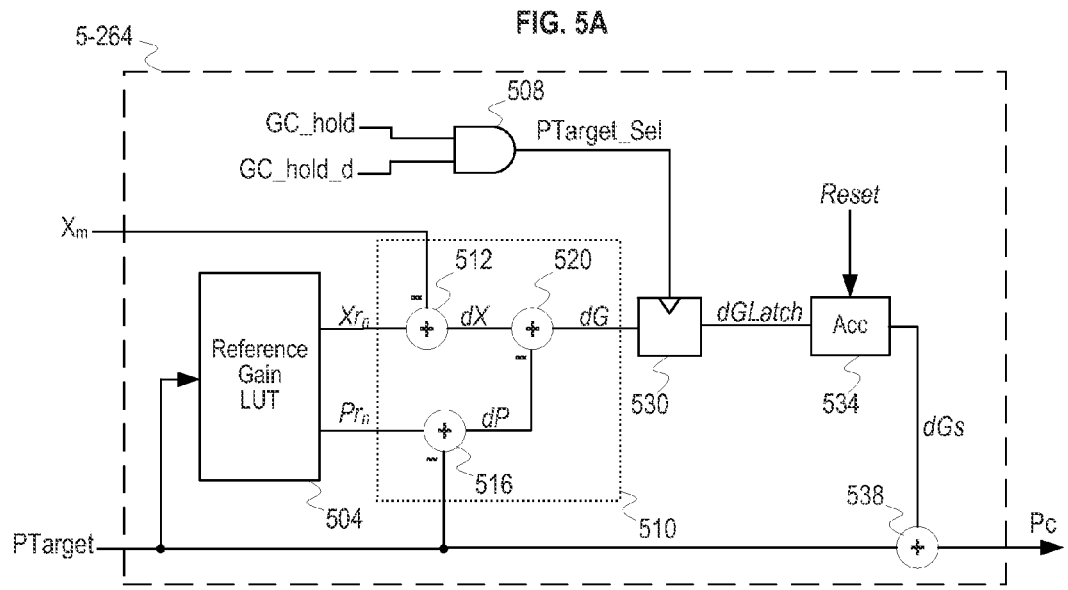
FIG. 5A is a circuit diagram of a gain corrector in accordance with an embodiment.

FIG. 5A is a circuit diagram of a gain corrector 5-264 in accordance with an embodiment of the disclosure. In this embodiment, the gain corrector 5-264 is used in the transmitter 2-110 and includes a gain difference circuit 510 and a reference gain Look-Up Table (LUT) 504 (or calibration data circuit).

The reference gain LUT 504 comprises calibration data for the TX path 210 (see FIG. 2) including a plurality of reference points. Each reference point includes a reference gain value Xr (or calibration gain signal) and a reference power level Pr. The reference gain value Xr of a reference point corresponds to a gain of the TX path 210 that produces the reference power level Pr of the reference point, when the TX path 210 is operating under a calibration condition. For example, in an embodiment, a reference point in the reference gain LUT 504 with a reference gain value Xr of 30 and a reference power level Pr of 14 indicates that TX path 210 under the calibration condition produced a transmit power of 14 dBm when the TX path gain signal $X_m$ was 30 dB. In an embodiment, the reference points correspond to gain switch points of the RX path 2-240 and/or gain switch points of the power amplifier 2-234.

The reference gain LUT 504 is accessed using the power target PTarget to select a corresponding reference point and output a reference gain value $Xr_n$ and a reference power level $Pr_n$ of the corresponding reference point. In an embodiment, the corresponding reference point is the reference point in reference gain LUT 504 having a reference power levels Pr that is closest to the power target PTarget without being less than the power target PTarget. In another embodiment, the reference gain LUT 504 includes S+1 reference points $\{(P_0, X_{r\_0}), (P_1, X_{r\_1}), \ldots (P_S, X_{r\_S})\}$, and the reference gain LUT 504 produces a reference gain value $Xr_n$ and a reference power level $Pr_n$ according to Equation 5:

$$Pr_n, Xr_n = \begin{cases} P_0, X_{r\_0} & (PTarget \leq P_0), \\ P_i, X_{r\_i} & (P_{i-1} < PTarget \leq P_i, i = 1 \ldots S), \\ P_S, X_{r\_S} & (PTarget > P_S) \end{cases} \quad \text{Equation 5}$$

Figure 5B:
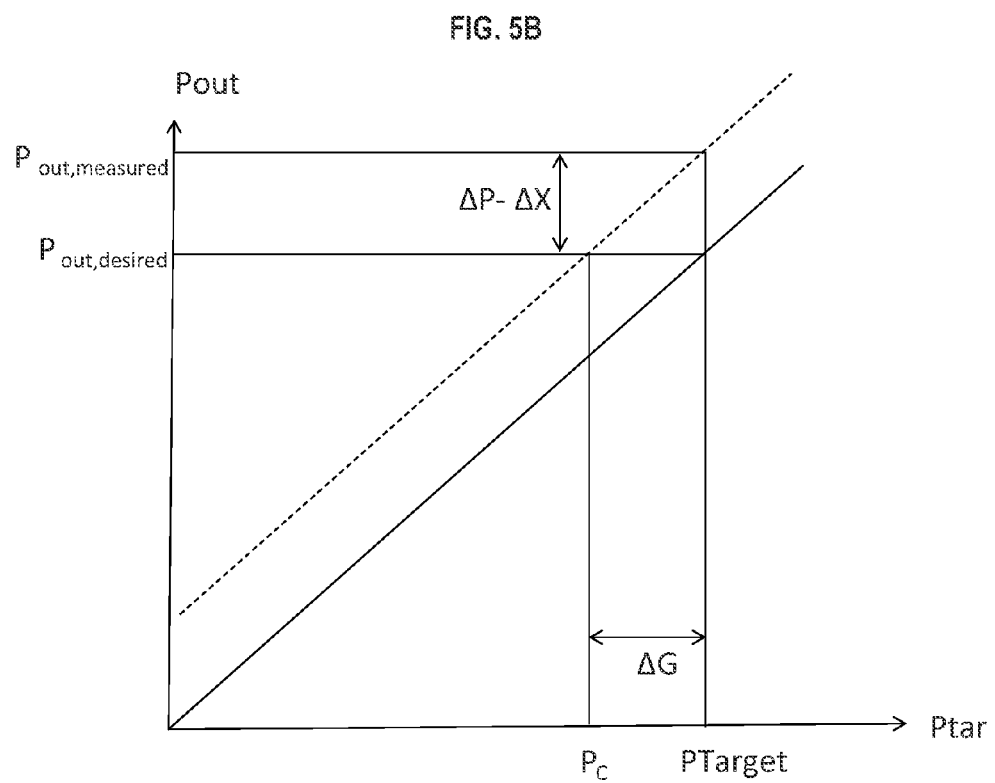
FIG. 5B is a diagram illustrating a relationship between a power target input and a power output.

Referring to FIG. 5B, a solid line (or calibration line) represents a relationship between a power target input Ptar and a power output Pout measured at the antenna 2-140 (see FIG. 2) under a calibration condition. Under the calibration condition, a target power level PTarget produces a desired output power $P_{out,desired}$ that has substantially the same level as that of the target power level PTarget. On the other hand, a dashed line (or actual line) represents a relationship between the power target input Ptar and the power output Pout under an actual operation condition. The dashed line is shifted from the calibration line due to variations in a gain of the transmitter 210 (see FIG. 2) due to the actual operation condition imposing different temperatures, voltages, currents, and/or frequencies on circuit elements in the transmitter 210 relative to what was imposed by the calibration condition.

As a result, when a target power level PTarget that produces a desired output power $P_{out,desired}$ under the calibration condition is inputted under the actual operation condition, a different level $P_{out,measured}$ of the output power Pout from the desired output power level $P_{out,desired}$ is measured. In order to generate the desired output power level $P_{out,desired}$, the target power level PTarget is adjusted to a corrected power level Pc by a gain error $\Delta G$, as expressed by the following equation:

$$Pc = PTarget - \Delta G \qquad 6$$

Calculation of the gain error $\Delta G$ is explained below in more detail.

In an embodiment, a power difference $\Delta P$ is defined as a difference (=$Pr_n$−PTarget) between a reference power level $Pr_n$ and the target power level PTarget. A gain difference $\Delta X$ is defined as a difference (=$Xr_n$−$X_m$) between a reference gain value $Xr_n$ associated with the reference power level $Pr_n$ and the measured TX path gain value $X_m$. The reference gain value $Xr_n$ corresponds to a gain of the transmit path 210 that produces the reference power level $Pr_n$ under a calibration condition. Thus, a difference between the power difference $\Delta P$ and the gain difference $\Delta X$ is expressed as:

$$\Delta P - \Delta X = P_{rn} - PTarget - (X_{rn} - X_M) = P_{rn} - PTarget - (P_{rn} - P_{out,measured}) = P_{out,measured} - PTarget = P_{out,measured} - P_{out,desired} \qquad 7$$

In FIG. 5B, the slope of the actual line substantially corresponds to one, similarly to the calibration line. As a result, the difference between $\Delta P$ and $\Delta X$ becomes equal to the gain error $\Delta G$, as expressed by:

$$\Delta P - \Delta X = \Delta G \qquad 8$$

In an embodiment, the gain correction scheme as described above is implemented by circuit elements in FIG. 5A. In this embodiment, the gain difference circuit 510 includes a first adder 512, a second adder 516, and a third adder 520. The gain difference circuit calculates a gain error signal dG using the measured gain signal $X_m$ and a calibration gain signal. For example, the calibration gain signal includes a reference gain value $Xr_n$ and a reference power level $Pr_n$.

The first adder 512 subtracts the TX path gain signal $X_m$ from the reference gain value $Xr_n$ to produce a gain difference signal dX. The second adder 516 subtracts the power target PTarget from the reference power levels $Pr_n$ to produce a power difference signal dP.

The third adder 520 interpolates between the reference points in the reference gain LUT 504 by subtracting the power difference signal dP from the gain difference signal dX to produce a gain error signal dG. The gain error signal dG therefore corresponds to a variation in the measured gain in the TX path 210 relative to an interpolation of the calibration data stored in the reference gain LUT 504.

An AND gate 508 combines the GC hold signal GC_hold and the delayed GC hold signal GC_hold_d to produce a power target select signal PTarget_Sel. The power target select signal PTarget_Sel includes a signal indicating the end of the first and second gain estimation windows. For example, a rising edge of the power target select signal PTarget_Sel may indicate that both the first and second gain estimation windows have ended.

In response to the power target select signal PTarget_Sel indicating that the first and second gain estimation windows have ended, a latch 530 latches the gain error signal dG to produce latched gain error signal dGLatch.

An accumulator (ACC) 534 receives the latched gain error signal dGLatch. The accumulator 534 is periodically reset to zero by the Reset signal. In an embodiment, the accumulator 534 may be reset to zero when a first transmit slot begins or when the transmitter resumes transmitting after a period of not transmitting.

After being reset, the accumulator 534 accumulates the values of the latched gain error signal dGLatch after the end of the first and second gain estimation windows to produce an accumulated error signal dGs. A fourth adder 538 (or power target correction circuit) adds the accumulated error signal dGs to the power target PTarget to produce the corrected output power target signal Pc.

FIG. 6 depicts waveforms showing operation of the gain correction block 5-264 of FIG. 5 according to an embodiment of the disclosure.

At a time t61, the power target PTarget is set to a value PT1. The accumulator 534 is reset and accordingly the accumulated error signal dGs is zero. Therefore a value PC1 of the corrected output power target signal Pc has a value PC1 equal to the value PT1.

At a time t62, a first occurrence of a first and second Gain Estimation Windows (GEWs) has ended. The power target select signal PTarget_Sel indicates the completion of the calculation of the gain error signal dG, and the latch 530 latches the gain error signal dG to produce the latched gain error signal dGLatch. The latched gain error signal dGLatch at t62 has a value DGL1.

The accumulator 534 then adds the value DGL1 of the latched gain error signal LdG to the prior value (zero) of the accumulator 534. Accordingly, the accumulated error signal dGs immediately after the time t62 has a value DGS1 equal to the value DGL1.

The adder 538 adds the accumulated error signal dGs to the power target PTarget. Accordingly, the corrected output power target signal Pc has a value PC2 equal to the value PT1 plus the value DGS1.

At a time t63, the power target PTarget is changed to a value PT2. Accordingly, the corrected output power target signal Pc has a value PC3 equal to the value PT2 plus the value DGS1.

At a time t64, a second occurrence of the first and second GEWs has ended. The power target select signal PTarget_Sel indicates the completion of the calculation of the gain error signal dG, and the latch 530 latches the gain error signal dG to produce the latched gain error signal dGLatch. The latched gain error signal dGLatch at t64 has a value DGL2.

The accumulator 534 then adds the value DGL2 of the latched gain error signal dGLatch to the prior value (the value DGS1) of the accumulator 534. Accordingly, the accumulated error signal dGs immediately after the time t64 has a value DGS2 equal to the value DGS1 plus the value DGL2. In the example shown in FIG. 6, the value DGL2 is negative, and accordingly DGS2 is less than DGS1.

The adder 538 adds the accumulated error signal dGs to the power target PTarget. Accordingly, the corrected output power target signal Pc has a value PC4 equal to the value PT2 plus the value DGS2.

Figure 7:
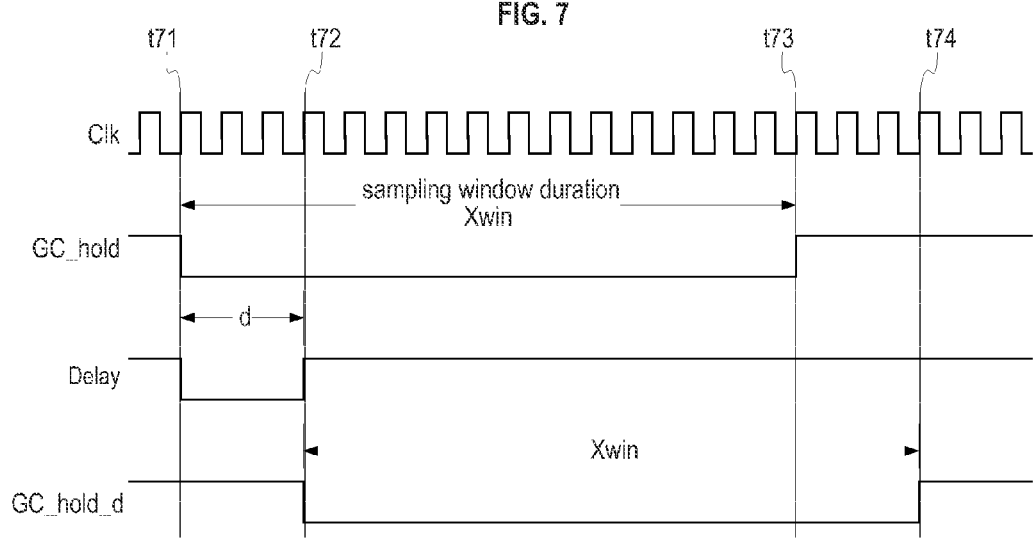
FIG. 7 depicts waveforms showing generation of control signals in accordance with an embodiment.

FIG. 7 depicts waveforms showing generation of control signals in accordance with an embodiment of the disclosure, including the GC hold signal GC_hold and the delayed GC hold signal GC_hold_d. A clock signal Clk is used in the generation of the signals shown of FIG. 7. In an embodiment, a frequency of the clock Clk is equal to a sampling rate of the TX path 210 (see FIG. 2).

At a time t71, gain estimation begins as the GC hold signal GC_hold transmits a TX sampling begin signal, such as by the GC hold signal GC_hold having a low value. Also at t71, a delay circuit transmits a delay start signal, such as by the delay signal having a low value. In an embodiment, the delay circuit is a counter that counts the number of cycles of clock Clk.

At a time t72 that follows the time t71 by a delay interval d, the delay circuit transmits a delay end signal, such as by the delay signal having a high value. As a result the delayed GC hold signal GC_hold_d transmits an RX sampling begin signal, such as by the delayed GC hold signal GC_hold_d having a low value.

The delay interval d properly aligns a measurement of the $I_{TX}/Q_{TX}$ data with a measurement of the $I_{RX}/Q_{RX}$ data and relates to the round-trip time for a signal passing through the TX path 210 and the RX path 2-240. In an embodiment, the delay interval d is a preset value, for example, 9 cycles of the clock Clk. In another embodiment, the delay interval d is determined using a calibration procedure.

At a time t73 that follows the time t71 by a sampling window duration Xwin, the GC hold signal GC_hold transmits a TX sampling end signal, such as by the GC hold signal GC_hold having a high value. In an embodiment, the sampling window duration Xwin is a predefined value, for example, five microseconds or 156 cycles of the clock Clk. The sampling window duration Xwin is selected to be much smaller than an allowed transmit power transition time specified for an applicable wireless standard.

At a time t74 that follows the time t72 by a sampling window duration Xwin, the delayed GC hold signal GC_hold_d transmits an RX sampling end signal, such as by the delayed GC hold signal GC_hold_d having a high value.

Figure 8:
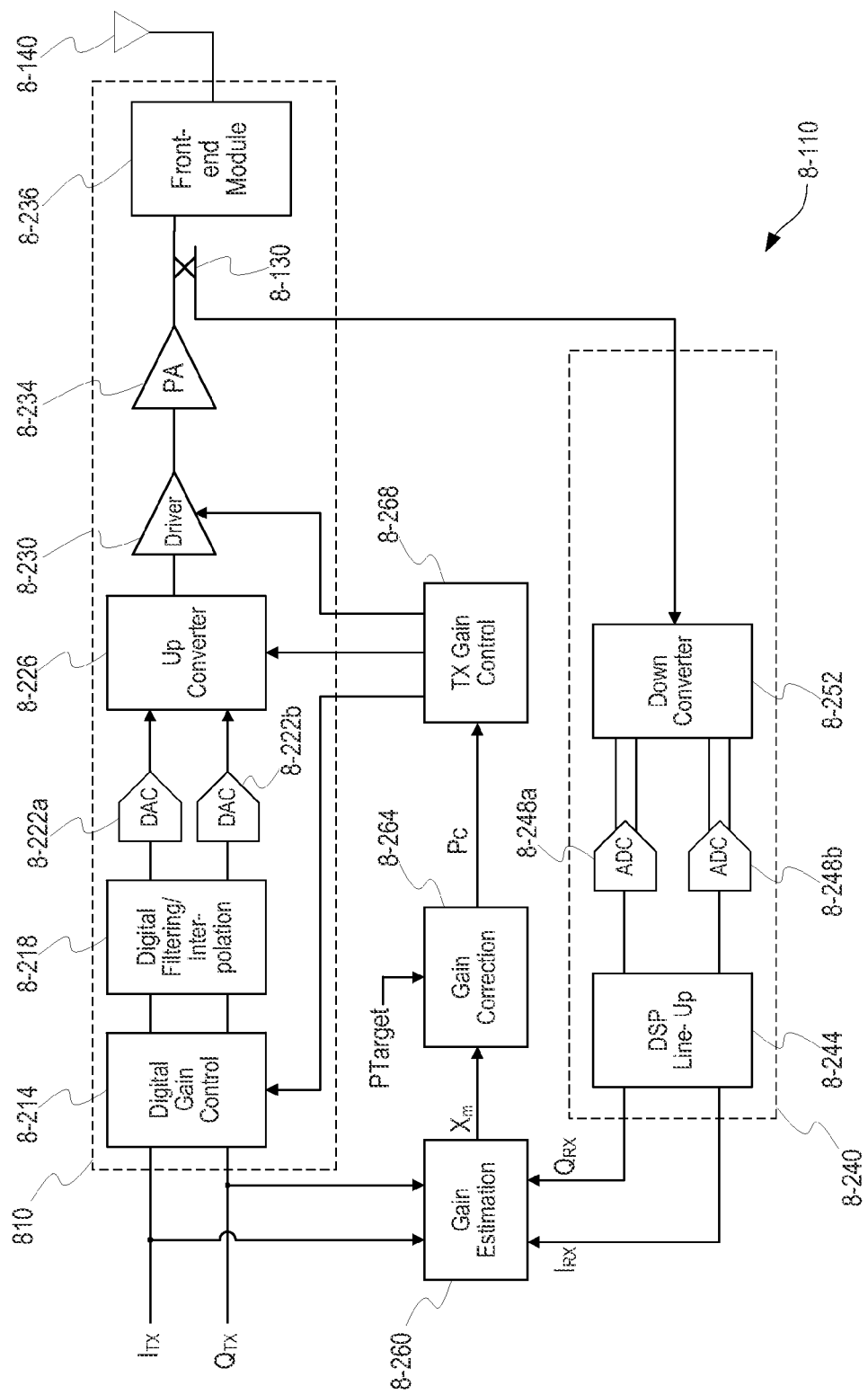
FIG. 8 is a circuit diagram of a transmitter in accordance with an embodiment.

FIG. 8 is a circuit diagram of a transmitter 8-110 in accordance with an embodiment of the disclosure. The transmitter 8-110 may be used in the wireless device 100 and includes a transmitter (TX) path 810 and a receiver (RX) path 8-240. The elements of transmitter 8-110 operate similarly to the similarly numbered elements of transmitter 2-110 of FIG. 2.

The transmitter 8-110 differs from the transmitter 2-110 of FIG. 2 in where the RX paths 2-240 and 8-840 receive the feedback signal from the TX paths 210 and 810, respectively. In the transmitter 2-110, the RX path 2-240 receives signals from directional coupler 2-130 connected between front-end module 2-236 and antenna 2-140. In the transmitter 8-110, the RX path 8-240 receives signals from directional coupler 8-130 connected between power amplifier 8-234 and front-end module 8-236.

Required dynamic ranges of the down converter 8-252 and ADCs 8-248a and 8-248b of the transmitter 8-110 may be lower than required dynamic ranges of the corresponding down converter 2-252 and ADCs 2-248a and 2-248b of the transmitter 2-110.

Because transmitter 8-110 collects feedback before front-end module 8-236, the time delay d used to generate delayed GC hold signal GC_hold_d and the feedback gain compensation signal FGComp may differ from the corresponding values used in the transmitter 2-110.

Figure 9:
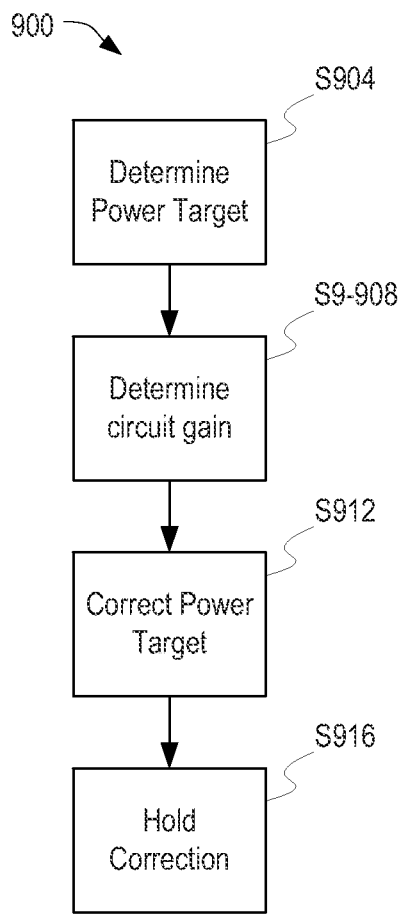
FIG. 9 is a flowchart showing a method of automatic power control in accordance with an embodiment.

FIG. 9 is a flowchart showing a method 900 for automatic power control in accordance with an embodiment.

At S904, a first value of an output power target of a circuit is determined. In an embodiment, determining the first value of the output power target includes receiving a requested output power target.

At S9-908, a gain of the circuit is determined. In an embodiment, determining the gain of the circuit is performed periodically during the ordinary operation of the circuit. In an embodiment, the determined gain is a gain of a transmit path of the circuit. In an embodiment, determining the gain of the circuit includes measuring an input signal of the circuit and an output signal of the circuit. In an embodiment, measuring the output signal of the circuit includes measuring a received output signal of a receive path connected to the output signal of the circuit, and may include using calibration data related to the receive path.

At S912, a second value of the output power target of the circuit is determined according to the measured gain of the circuit which is a corrected power output. In an embodiment, determining the second value of the output power target includes comparing the determined gain of the circuit to a target gain associated with the requested output power target. In an embodiment, determining the second value of the output power target of the circuit power includes using calibration data related to the circuit. In an embodiment, the calibration data comprises a plurality of reference points, a reference point including a power target value and a gain value.

At S916, the correction applied to the power target is held or maintained until the next power update. In an embodiment, holding or maintaining the correction until the next power update includes the correction being a first correction and holding or maintaining the first correction until a second correction is determined. In an embodiment, holding or maintaining the correction until the next power update includes the requested power target being a first requested power target, receiving a second requested output power target, and determining a third value of the output power target of the circuit using the second requested output power target and the determined gain of the circuit.

Figure 10:
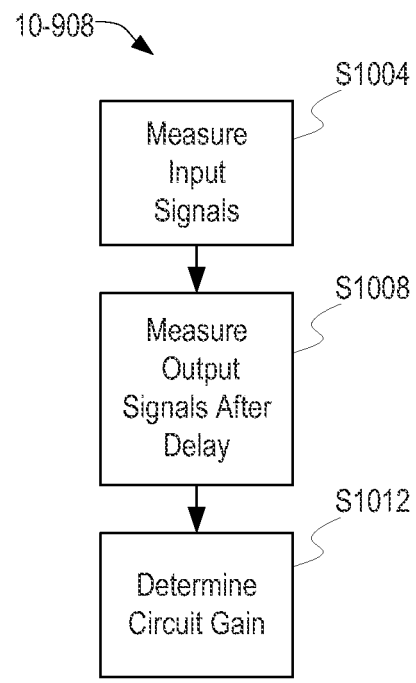
FIG. 10 is a flowchart showing a method of determining a gain of a circuit in accordance with an embodiment.

FIG. 10 is a flowchart showing a method 10-908 of determining the gain of a circuit in accordance with an embodiment. The method 10-908 of determining the gain of a circuit may be used in the method 900 of automatic power control of FIG. 9.

At S1004, an input signal is measured during a first gain estimation window to produce an input signal measurement. In an embodiment, the input signal measurement includes an average of a magnitude of the input signal during the first gain estimation window. In an embodiment, the input signal measurement includes an average of a power of the input signal during the first gain estimation window. In an embodiment, the input signal is a baseband input signal to a transmitter. In an embodiment, the input signal comprises a plurality of I and Q signals.

At S1008, a received signal is measured during a second gain estimation window to produce a received signal measurement, wherein a beginning of the second gain estimation window occurs after a delay from a beginning of the first gain estimation window. In an embodiment, the duration of the first gain estimation window is substantially the same as the duration of the second gain estimation window.

In an embodiment, the received signal measurement corresponds to an average of a magnitude of the received signal during the second gain estimation window. In an embodiment, the received signal measurement corresponds to an average of a power of the received signal during the second gain estimation window.

In an embodiment, the received signal is a baseband signal. In an embodiment, the received signal is generated using a receive path connected to an output signal of the circuit. In an embodiment, generating the received signal using the receive path includes down-converting a signal received from the circuit and/or performing an Analog-to-Digital (A-to-D) conversion of the down-converted signal. In an embodiment, the received signal comprises a plurality of I and Q signals.

The delay from the beginning of the first gain estimation window to the beginning of the second gain estimation window time-aligns the received signal within the second gain estimation window with the input signal within the first gain estimation window. In an embodiment, the delay between the beginning of the first gain estimation window and the beginning of the second gain estimation window is determined according to a propagation time through a transmitter path, a directional coupler, and the receive path. In an embodiment, the delay between the beginning of the first gain estimation window and the beginning of the second gain estimation window is determined by counting a number of cycles of a clock during the delay.

At S1012, a gain of the circuit is determined according to the input signal measurement and the received signal measurement. In an embodiment, determining the gain of the circuit comprises determining and outputting a difference of the input signal measurement and the received signal measurement. In an embodiment, determining the gain of the circuit comprises adjusting the output signal measurement according to a feedback gain compensation value.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A circuit comprising:
   a transmit path to receive an input signal and generate an output signal at a transmit power level according to a power target signal;
   a gain corrector to output a signal for adjusting a power level of the output signal to correspond to the transmit power level, the signal for adjusting being based on the power target signal and a delay for time-aligning a first signal and a second signal;
   a transmit gain controller to provide a gain control signal to cause the power level of the output signal to be adjusted based on the gain control signal so that the output signal is output at the transmit power level;
   a receive path to receive the output signal of the transmit path and generate a received signal; and
   a gain estimator to output a measured gain signal associated with the transmit path using a first average signal of the input signal during a first estimation window and a second average signal of the received signal during a second estimation window.

2. The circuit of claim 1, wherein the gain corrector determines the signal for adjusting using the power target signal and the measured gain signal.

3. The circuit of claim 2, wherein the first signal is the input signal and the second signal is the received signal, and a beginning of the second gain estimation window occurs the delay after a beginning of the first gain estimation window.

4. The circuit of claim 3, wherein the delay includes a propagation delay through the transmit path and a propagation delay through the receive path.

5. The circuit of claim 1,
wherein the transmit path includes an up converter,
wherein the receive path includes a down converter, and
wherein the input signal and the received signal include baseband signals.

6. The circuit of claim 1, further comprising a first envelope processor and a second envelope processor, wherein the first average signal includes an average of a magnitude of the input signal during the first estimation window determined using the first envelope processor and the second average signal includes an average of a magnitude of the received signal during the second estimation window determined using the second envelope processor.

7. The circuit of claim 1, further comprising a first envelope processor and a second envelope processor, wherein the first average signal includes an average power of the input signal during the first estimation window determined using the first envelope processor and the second average signal includes an average power of the received signal during the second estimation window determined using the second envelope processor.

8. The circuit of claim 1, wherein the circuit is incorporated into an integrated circuit or a semiconductor chip.

9. A circuit comprising:
a transmit path to receive an input signal and generate an output signal at a transmit power level according to a power target signal; and
a gain corrector to output a signal for adjusting a power level of the output signal to correspond to the transmit power level, the signal for adjusting being based on the power target signal and a delay for time-aligning a first signal and a second signal,
wherein the gain corrector comprises:
a calibration data circuit configured to determine a calibration gain signal using the power target signal;
a gain difference circuit configured to determine a gain error signal using the measured gain signal and the calibration gain signal;
a latch configured to hold the gain error signal; and
a power target correction circuit to determine the signal for adjusting using the gain error signal and the power target signal.

10. The circuit of claim 9, wherein the calibration gain signal includes a reference gain value and a reference power level, and
wherein the gain difference circuit comprises:
a first adder to calculate a gain difference signal by subtracting the measured gain signal from the reference gain value;
a second adder to calculate a power difference signal by subtracting the power target signal from the reference power level; and
a third adder to determine the gain error signal by subtracting the power difference signal from the gain difference signal.

11. A method, comprising:
generating an output signal at a transmit power level according to a power target signal, the output signal being based on an input signal received;
outputting a signal for adjusting a power level of the output signal to correspond to the transmit power level, the signal for adjusting being based on the power target signal and a delay for time-aligning a first signal and a second signal;
providing a gain control signal to cause the power level of the output signal to be adjusted based on the gain control signal so that the output signal is output at the transmit power level;
generating a received signal based on the output signal received from the transmit path; and
outputting a measured gain signal associated with the transmit path using a first average signal of the input signal during a first estimation window and a second average signal of the received signal during a second estimation window.

12. The method of claim 11, wherein the signal for adjusting is determined using the power target signal and the measured gain signal.

13. The method of claim 12, wherein the first signal is the input signal and the second signal is the received signal, and a beginning of the second gain estimation window occurs the delay after a beginning of the first gain estimation window.

14. The method of claim 13, wherein the delay includes a propagation delay through the transmit path and a propagation delay through the receive path.

15. The method of claim 11, wherein the first average signal includes an average magnitude of the input signal during the first estimation window and the second average signal includes an average magnitude of the received signal during the second estimation window.

16. The method of claim 11, wherein the first average signal includes an average power of the input signal during the first estimation window and the second average signal includes an average power of the received signal during the second estimation window.

17. The method of claim 11, wherein determining the signal for adjusting includes:
receiving the power target signal;
determining a calibration gain signal using the power target signal; and
determining a gain error signal using the measured gain signal and the calibration gain signal, whereby the signal for adjusting is determined using the gain error signal and the power target signal.

18. The method of claim 17, wherein determining the calibration gain signal includes generating a reference gain value and a reference power level corresponding to the power target signal, and
wherein determining the gain error signal includes subtracting the measured gain signal from the reference gain value to calculate a gain difference signal, subtracting the power target signal from the reference power level to calculate a power difference signal, and subtracting the power difference signal from the gain difference signal to determine the gain error signal.

* * * * *